US010264145B2

(12) United States Patent
Hur

(10) Patent No.: US 10,264,145 B2
(45) Date of Patent: Apr. 16, 2019

(54) PRINTING DATA BY AN IMAGE FORMING APPARATUS USING A SAME OR DIFFERENT NETWORK AS A PRINTING DATA STORAGE DEVICE

(71) Applicant: HP PRINTING KOREA CO., LTD., Suwon-si, Gyeonggi-Do (KR)

(72) Inventor: Jun-hui Hur, Yongin-si (KR)

(73) Assignee: HP Printing Korea Co., Ltd., Suwon-si (KR)

( * ) Notice: Subject to any disclaimer, the term of this patent is extended or adjusted under 35 U.S.C. 154(b) by 0 days.

(21) Appl. No.: 15/407,841

(22) Filed: Jan. 17, 2017

(65) Prior Publication Data

US 2017/0208182 A1  Jul. 20, 2017

(30) Foreign Application Priority Data

Jan. 18, 2016 (KR) ........................ 10-2016-0005987

(51) Int. Cl.
*G06F 3/12* (2006.01)
*H04N 1/00* (2006.01)
*H04N 1/32* (2006.01)

(52) U.S. Cl.
CPC ....... *H04N 1/0023* (2013.01); *H04N 1/00307* (2013.01); *H04N 1/00344* (2013.01); *H04N 1/32101* (2013.01); *H04N 1/32523* (2013.01); *H04N 2201/0039* (2013.01); *H04N 2201/0094* (2013.01); *H04N 2201/3228* (2013.01)

(58) Field of Classification Search
CPC ............. H04N 1/0023; H04N 1/00307; H04N 1/00344; H04N 1/32101; H04N 1/32523; H04N 2201/0039; H04N 2201/0094; H04N 2201/3228; G06F 3/1267; G06F 3/1268; G06F 3/1278; H04L 63/08
USPC ......................................... 358/1.1–1.18, 402
See application file for complete search history.

(56) References Cited

U.S. PATENT DOCUMENTS

| 9,098,220 | B2 | 8/2015 | Kikuchi | |
|---|---|---|---|---|
| 9,557,942 | B2* | 1/2017 | Tajima | G06Q 10/10 |
| 2008/0304101 | A1* | 12/2008 | Sasase | G06F 3/1204 358/1.15 |
| 2009/0051956 | A1* | 2/2009 | Kondo | G06F 21/34 358/1.13 |
| 2013/0003125 | A1* | 1/2013 | Morii | G06K 15/1817 358/1.15 |
| 2014/0009776 | A1* | 1/2014 | Suzuki | G06K 15/1807 358/1.13 |
| 2015/0081845 | A1* | 3/2015 | Arai | G06F 3/1204 709/218 |

* cited by examiner

*Primary Examiner* — Gabriel I Garcia
(74) *Attorney, Agent, or Firm* — Jefferson IP Law, LLP

(57) ABSTRACT

A server and a method of operating the same are provided. The method includes receiving metadata corresponding to printing data from a printing data storage device that stores the printing data, receiving, from an image forming apparatus, a request to transmit printing job information, determining a transmission route of the printing data based on whether the printing data storage device and the image forming apparatus are capable of communicating with each other, generating printing job information including the metadata and the transmission route, and transmitting the printing job information to the image forming apparatus.

14 Claims, 18 Drawing Sheets

FIG. 5

| USER IDENTIFICATION INFORMATION 501 | TASK NAME 502 | TRANSMISSION TIME 503 | STORED LOCATION 504 | TASK IDENTIFICATION INFORMATION 505 |
|---|---|---|---|---|
| USER A | PHOTO | 2015/10/05 13:21:55 | 192.168.03 | 000000001 |
| USER B | DOCUMENT | 2015/10/03 21:30:22 | 192.168.0.1 | 000000002 |

FIG. 7

```
{
"JobID": "<string>",
"DocumentName": "<string>",
"SubmitTime": "<string>",
"TimeLeft": "<datetime>",
"ColorMode":"<COLOR|MONOCHROME>",
"Duplex":"<string>",
"Collate":"<string>",
"Copies":"<string>",
"Storage":"192.168.0.3"
} ...
```
701

FIG. 10

| SERIAL NUMBER | MAC ADDRESS | IP ADDRESS | CONNECTABLE |
|---|---|---|---|
| 123456 | 3D:4F:22:33 | 192.168.0.8 | 192.168.0.5 |
| 123456 | 3D:4F:22:33 | 192.168.0.8 | 192.168.0.5 |
| 123456 | 3D:4F:22:33 | 192.168.0.8 | 192.168.0.5 |

PRINTING DATA BY AN IMAGE FORMING APPARATUS USING A SAME OR DIFFERENT NETWORK AS A PRINTING DATA STORAGE DEVICE

CROSS-REFERENCE TO RELATED APPLICATION(S)

This application claims the benefit under 35 U.S.C. § 119(a) of a Korean patent application filed on Jan. 18, 2016 in the Korean Intellectual Property Office and assigned Serial No. 10-2016-0005987, the entire disclosure of which is hereby incorporated by reference.

TECHNICAL FIELD

The present disclosure relates to a server and a method of operating the same.

BACKGROUND

Along with recent developments in electronic communication-related technology and network-related technology, various services utilizing these technologies have been developed and commercialized. According to this trend, image forming apparatuses, such as multifunction printers, are equipped with communication devices and provide services utilizing the communication devices.

In the related art, an image forming apparatus may support pull printing. Pull printing is a system that enables a user to store printing data in a server and, after user authentication, to print out the printing data by using any printer that may be connected to the server. Recently, a pull printing service is supported without a server and a pull printing service using a cloud server has been introduced.

However, when pull printing is supported without a server, it is difficult to support pull printing between printers connected to different networks, and the number of printers capable of supporting pull printing is limited. Furthermore, in the case of using a cloud server, it takes a long time to print out printing data due to rendering of the printing data in the cloud server.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a server capable of providing a pull printing service that enables printing data stored in a printing data storage device to be printed out via an image forming apparatus connected to a same network or a different network and a method of operating the server.

In accordance with an aspect of the present disclosure, a method of operating a server is provided. The method includes receiving metadata corresponding to printing data from a printing data storage device that stores the printing data, receiving, from an image forming apparatus, a request to transmit printing job information, determining a transmission route of the printing data based on whether the printing data storage device and the image forming apparatus are capable of communicating with each other, generating the printing job information including the metadata and the transmission route, and transmitting the printing job information to the image forming apparatus.

In accordance with another aspect of the present disclosure, a server is provided. The server includes a transceiver configured to communicate with an external device, and a processor configured to receive metadata corresponding to printing data from a printing data storage device that stores the printing data, receive, from an image forming apparatus, a request to transmit printing job information, generate printing job information, transmit the printing job information to the image forming apparatus, and determine a transmission route of the printing data based on whether the printing data storage device and the image forming apparatus are capable of communicating with each other, wherein the printing job information includes the metadata and the transmission route.

In accordance with another aspect of the present disclosure, a method of operating a printing data storage device is provided. The method includes receiving printing data from a printing client, storing the printing data, generating metadata corresponding to the printing data, transmitting the metadata to a server, when a set time has elapsed after the printing data is stored, extracting a part of the printing data, and transmitting the extracted part of the printing data to the server in advance.

In accordance with another aspect of the present disclosure, a printing data storage device is provided. The printing data storage device includes a transceiver configured to communicate with an external device, and a processor configured to receive printing data from a printing client, generate metadata corresponding to the printing data, transmit the metadata to a server, when a set time has elapsed after the printing data is stored, extract a part of the printing data, and transmit the extracted part of the printing data to the server in advance.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a diagram showing job identification (ID) information according to an embodiment of the present disclosure;

FIG. 7 is a diagram showing printing job information according to an embodiment of the present disclosure;

FIG. 10 is a diagram showing a list of connectable devices according to an embodiment of the present disclosure;

Throughout the drawings, it should be noted that like reference numbers are used to depict the same or similar elements, features, and structures.

DETAILED DESCRIPTION

Figure 1:
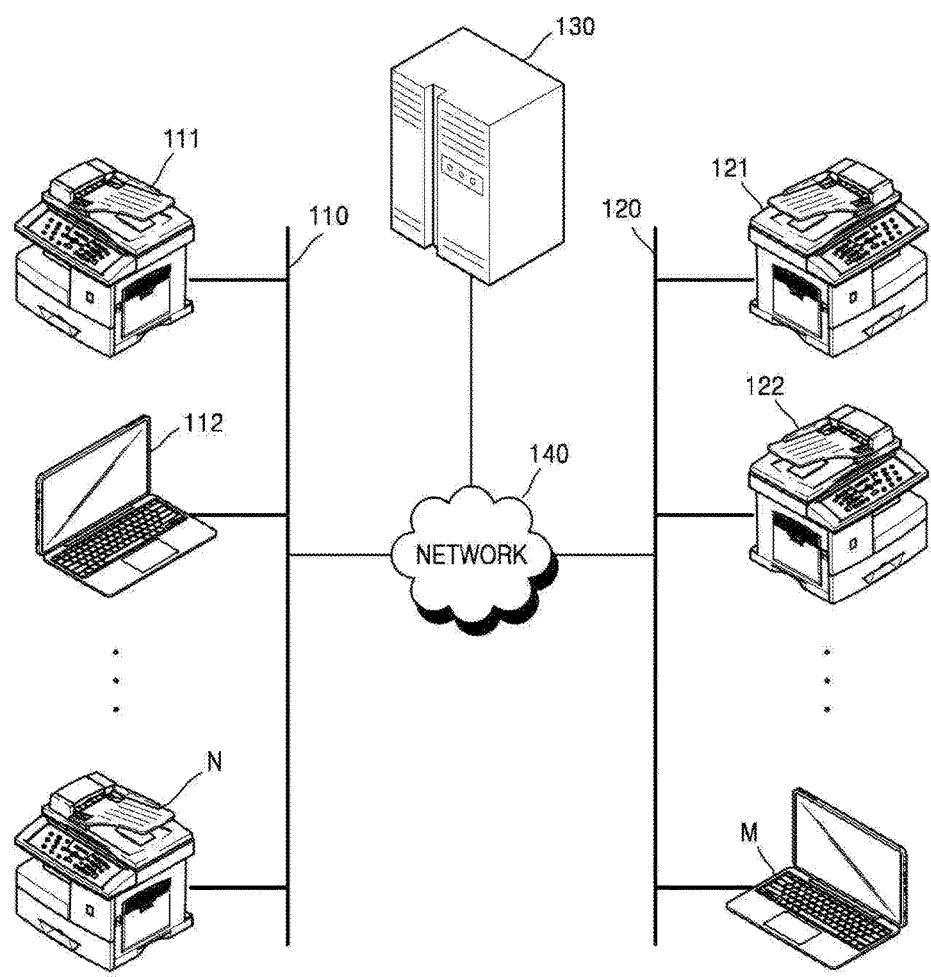
FIG. 1 is a diagram showing a system for providing a pull printing service according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, when a part is referred to as being "connected" to another part, it is not only the case where it is "directly connected", but also the case where it is "electrically connected". Also, throughout the specification, when an element is referred to as "including", it is to be understood that the element may include other elements, unless being stated otherwise. In addition, the term "unit" used in the specification means a hardware component such as software, field-programmable gate arrays (FPGA) or application-specific integrated circuit (ASIC), and a "unit" performs a certain function. However, a "unit" is not limited to software or hardware. A "unit" may be configured to be included in an addressable storage medium and may be configured to reproduce one or more processors. Therefore, examples of a "unit" include components including software components, object oriented software components, class components, and task components, processes, functions, attributes, procedures, subroutines, segments of program codes, drivers, firmware, micro-codes, circuits, data, databases, data structures, tables, arrays, and variables. Functions provided in components and "units" may be combined with one another into a smaller number of components and "units" or further separated into additional components and "units".

Hereinafter, various embodiments of the present disclosure will be described with reference to the accompanying drawings, so that those of ordinary skill in the art can readily implement the disclosed embodiments. However, the disclosed embodiments can be implemented in various different forms and are not limited to the various embodiments described herein. In order to clearly illustrate the various embodiments disclosed in the drawings, portions not related to the description are omitted.

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, appearance of a new technology, and the like. In addition, in certain cases, a term which is not commonly used may be selected. In such a case, the meaning of the term will be described in detail at the corresponding part in the description of the present disclosure. Therefore, the terms used in the various embodiments of the present disclosure should be defined based on the meanings of the terms and the descriptions provided herein.

FIG. 1 is a diagram showing a system for providing a pull printing service according to an embodiment of the present disclosure.

Referring to FIG. 1, the system for providing a pull printing service according to an embodiment includes devices 111, 112, . . . , and N connected to a first network 110, devices 121, 122, . . . , and M connected to a second network 120, and a server 130, where the first network 110, the second network 120, and the server 130 are connected to a network 140.

The devices 111, 112, . . . , and N connected to the first network 110 and the devices 121, 122, . . . , and M connected to the second network 120 may include a user device that executes a printing client, an image forming apparatus that receives printing data from the printing client and prints out the printing data, a printing data storage device that receives printing data from the printing client and stores the printing data, etc. According to an embodiment, the user device may include a device like a personal computer (PC), a laptop PC, a tablet PC, and a mobile phone, and the image forming apparatus may include a device like a fax machine, a printer, and a multifunction printer. The printing data storage device may include a relay device such as a relay server, or the image forming apparatus storing printing data received from the printing client may function as a printing data storage device.

Since the devices 111, 112, ..., and N connected to the first network 110 are included in a same network, the devices 111, 112, ..., and N may directly communicate with one another. In the same regard, the devices 121, 122, ..., and M connected to the second network 120 may directly communicate with one another. However, the devices 111, 112, ..., and N connected to the first network 110 are unable to directly communicate with the devices 121, 122, ..., and M connected to the second network 120, because the devices 111, 112, ..., and N are included in a network different to that in which the devices 121, 122, ..., and M are included.

According to an embodiment, each of the first network 110 and the second network 120 may include an intranet. Furthermore, a firewall may be installed in each of the first network 110 and the second network 120.

The server 130 is connected to the first network 110 and the second network 120 via the network 140. The server 130 may function as a relay server for transferring printing data between the first network 110 and the second network 120. According to an embodiment, the server 130 may receive printing data from the devices 111, 112, ..., and N connected to the first network 110 and transmit the printing data to the devices 121, 122, ..., M connected to the second network 120. Furthermore, the server 130 may also receive printing data from the devices 121, 122, ..., and M connected to the second network 120 and transmit the printing data to the devices 111, 112, ..., and N connected to the first network 110.

The network 140 interconnects the first network 110, the second network 120, and the server 130. According to an embodiment, the network 140 may include the Internet.

Figure 2:
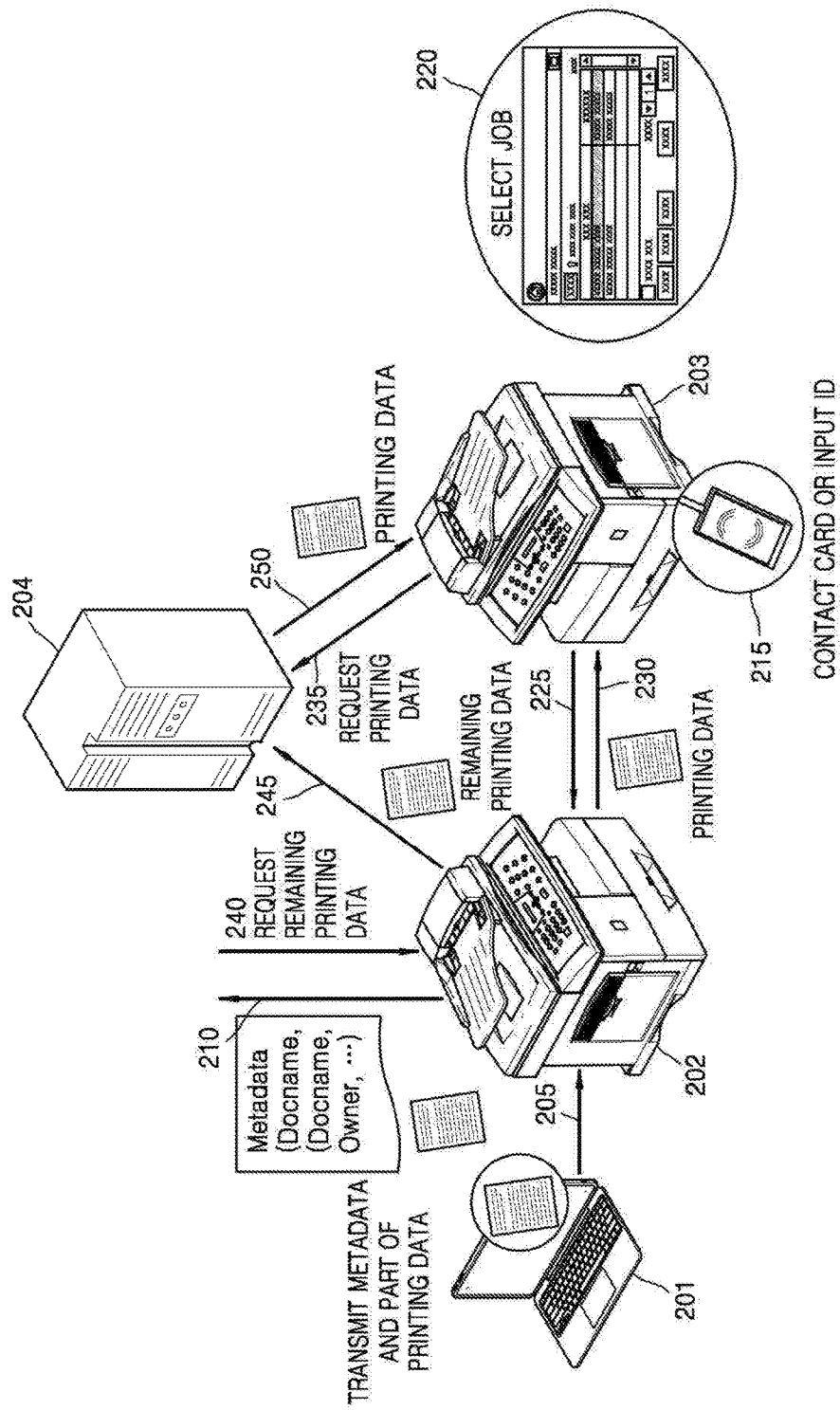
FIG. 2 is a flowchart of a method of providing a pull printing service according to an embodiment of the present disclosure.

FIG. 2 is a flowchart of a method of providing a pull printing service according to an embodiment of the present disclosure.

As described above, an image forming apparatus may function as a printing data storage device. As described below, FIG. 2 shows that an image forming apparatus functions as a printing data storage device.

Referring to FIG. 2, first, in operation 205, a user device 201 generates printing data and transmits the printing data to a printing data storage device 202. According to an embodiment, the printing data storage device 202 may store the printing data and generate metadata corresponding to the printing data. Here, the metadata may include data, such as user identification (ID) information regarding a user who sent a corresponding printing job, a printing job name, a transmission time, a printing option (duplex mode, color mode, number of copies, collated mode, etc.), etc. Furthermore, according to an embodiment, the printing data storage device 202 may extract a part of printing data when a set time is elapsed after the printing data is received.

In operation 210, the printing data storage device 202 transmits the metadata and the extracted part of the printing data to a server 204. According to an embodiment, the server 204 may generate job ID information based on the metadata and may transmit the job ID information to the printing data storage device 202.

In operation 215, a user logs into an image forming apparatus 203 by contacting a user ID card or inputting a user ID. According to an embodiment, the image forming apparatus 203 requests the server 204 for printing job information of the logged-in user. The server 204 determines whether the image forming apparatus 203 may communicate with the printing data storage device 202 and determines a transmission route of printing data. Here, when the server 204 determines that the image forming apparatus 203 is unable to communicate with the printing data storage device 202, the server 204 instructs the image forming apparatus 203 to receive printing data via the server 204. On the other hand, when the server 204 determines that the image forming apparatus 203 may communicate with the printing data storage device 202, the server 204 instructs the image forming apparatus 203 to receive printing data from the printing data storage device 202. Next, the server 204 generates printing job information including stored metadata and a transmission route and transmits the printing job information to the image forming apparatus 203.

In operation 220, the image forming apparatus 203 displays a job list based on the printing job information received from the server 204 and receives a job selecting input from the user. Next, the image forming apparatus 203 receives printing data according to a job selected by the user.

When the transmission route of the printing data included in the printing job information received from the server 204 is a route for receiving the printing data from the printing data storage device 202, the image forming apparatus 203 requests the printing data from the printing data storage device 202 in operation 225. Next, in operation 230, the image forming apparatus 203 receives the printing data from the printing data storage device 202 and outputs the printing data.

When the transmission route included in the printing job information received from the server 204 is a route for the image forming apparatus 203 to receive the printing data via the server 204, the image forming apparatus 203 requests the printing data from the server 204 in operation 235. When the server 204 receives a part of the printing data from the printing data storage device 202 and stores the same, the server 204 first transmits the part of the printing data to the image forming apparatus 203 and, in operation 240, requests the remaining printing data from the printing data storage device 202. Next, in operation 245, the server 204 receives the remaining printing data from the printing data storage device 202 and transmits the remaining printing data to the image forming apparatus 203 in operation 250. The image forming apparatus 203 receives the printing data from the server 204 and outputs the printing data. When the image forming apparatus 203 receives a part of the printing data from the server 204 in advance, the image forming apparatus 203 starts printing out a received part of the printing data first.

According to an embodiment, a pull printing service capable of printing out printing data stored in the printing data storage device 202 from image forming apparatuses connected to a same network and a different network may be provided. Furthermore, when the image forming apparatus 203 is capable of communicating with the printing data storage device 202, it is not necessary to receive printing data via the server 204 and printing data may be received directly from the printing data storage device 202, and thus the load of the server 204 and the network traffic may be reduced and data may be transmitted at a high speed. As a result, high printing speed may be provided. Furthermore, even when the image forming apparatus 203 is unable to communicate with the printing data storage device 202, a part of printing data is stored in the server 204 in advance, and thus high printing speed may be provided.

A method of providing a pull printing service according to an embodiment disclosed below will be described in more detail.

Figure 3:
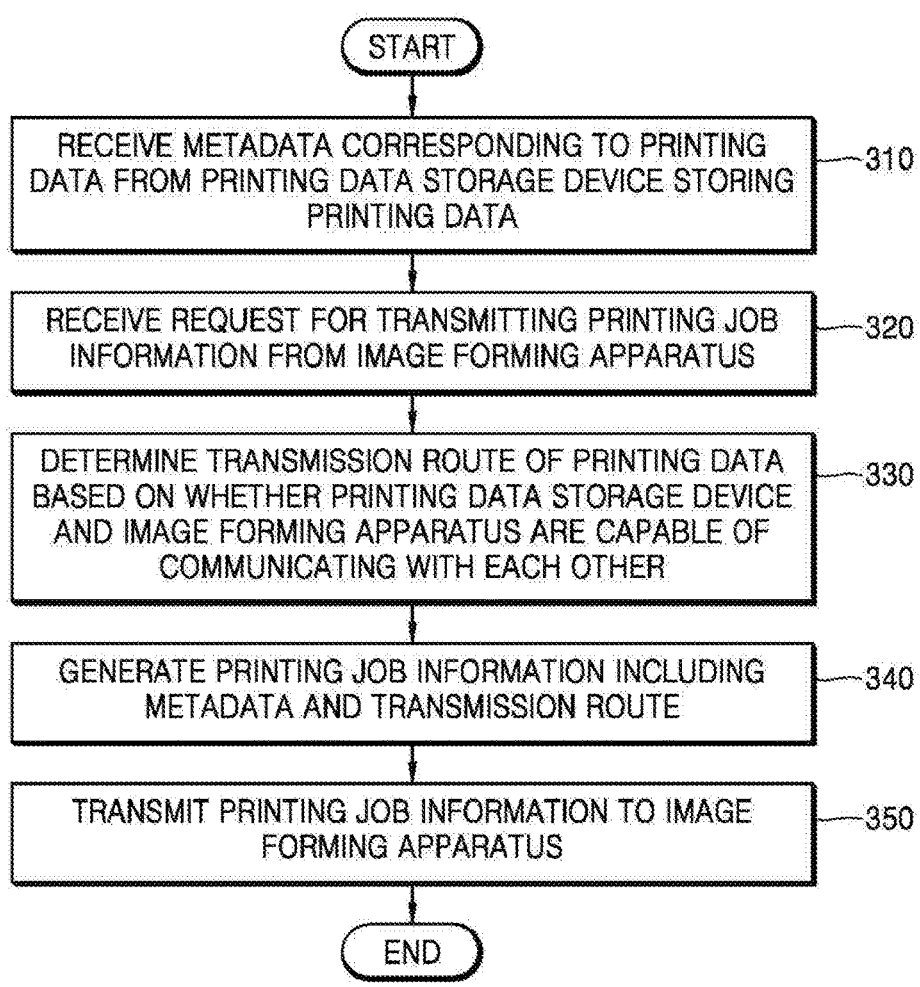
FIG. 3 is a flowchart of a method of operating a server according to an embodiment of the present disclosure.

FIG. 3 is a flowchart of a method of operating a server according to an embodiment of the present disclosure.

Referring to FIG. 3, first, in operation 310, the server 204 receives metadata corresponding to printing data from a printing data storage device storing the printing data. The operation of the server 204 related to other devices will be described below in more detail with reference to FIGS. 4 and 5.

Figure 4:
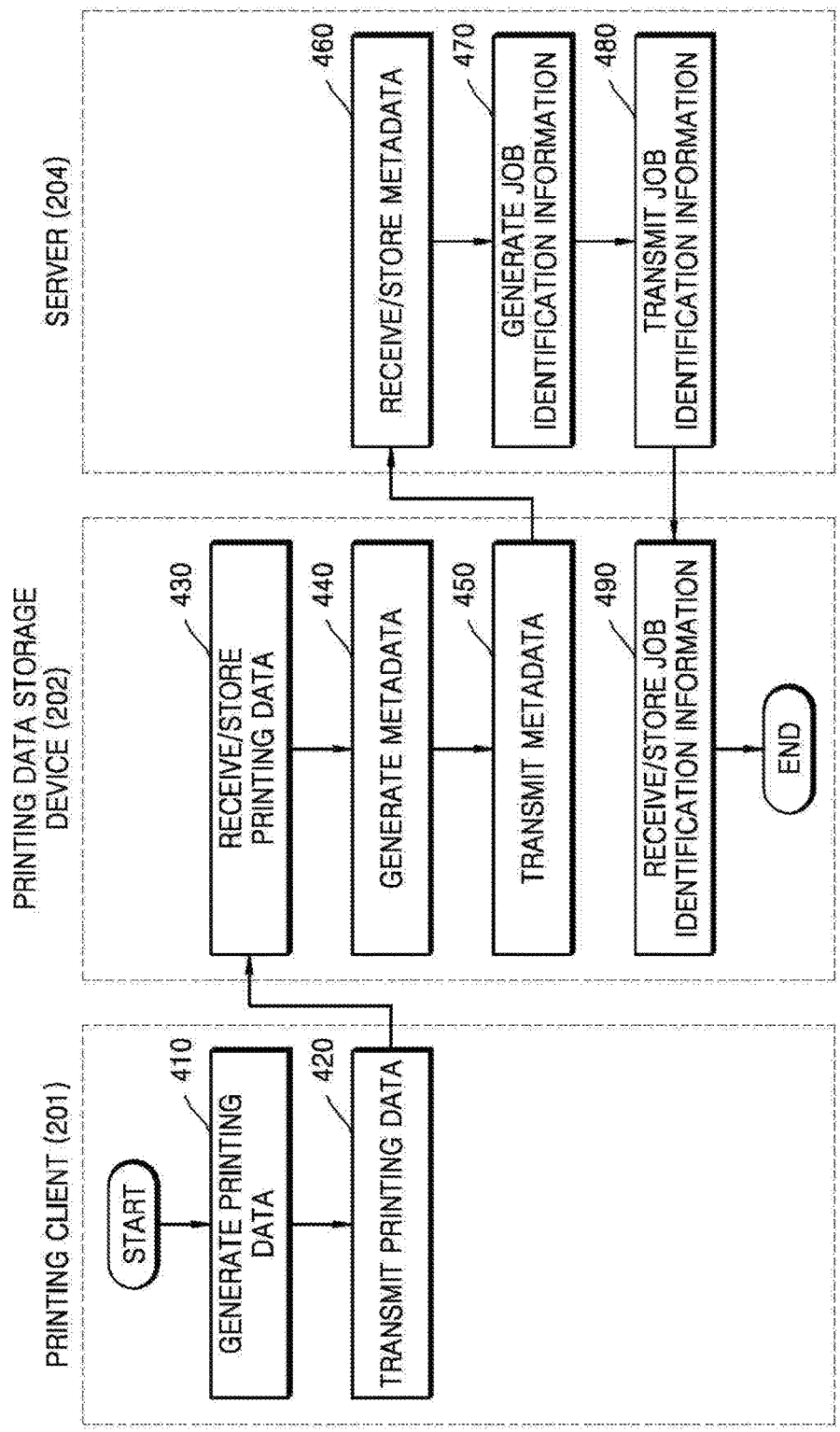
FIG. 4 is a flowchart of a process for processing metadata according to an embodiment of the present disclosure.

FIG. 4 is a flowchart of a process for processing metadata according to an embodiment of the present disclosure.

Referring to FIG. 4, a print client of the user device 201 generates printing data in operation 410. In operation 420, the user device 201 transmits the printing data to the printing data storage device 202. In operation 430, the printing data storage device 202 receives and stores the printing data. Next, in operation 440, the printing data storage device 202 generates metadata corresponding to the printing data and transmits the metadata to the server 204 in operation 450. Here, the metadata may include data like user ID information regarding a user who has sent a corresponding printing job, a name of the printing job, a transmission time, a printing option (duplex mode, color mode, number of copies, collated mode, etc.), and the like. Furthermore, the printing data storage device 202 may transmit ID information regarding the corresponding device, e.g., an Internet protocol (IP) address, a serial number, a media access control (MAC) address, etc.

The server 204 receives and stores metadata in operation 460 and generates job ID information based on the metadata in operation 470. The job ID information is information for identifying respective jobs received by the server 204. A description thereof will be given below with reference to FIG. 5.

FIG. 5 is a diagram showing job ID information according to an embodiment of the present disclosure.

Referring to FIG. 5, job ID information (e.g., task ID information) 505 may include information such as user ID information 501, a job name (e.g., task name) 502, a transmission time 503, and a storage location 504. Referring to FIG. 5, a user ID is used as user ID information, and an ID is assigned to the job ID information 505. For example, in job ID information having the ID 000000001, a user A sends a job called a photograph at 13:21:55 2015/10/05, and printing data regarding this job is stored in a device having an IP address of 192.168.0.3. Referring to FIG. 5, the server 204 stores two jobs. Every time the server 204 receives new metadata, the server 204 may add job information regarding the metadata. However, it is merely an example, and data included in job ID information may vary.

Referring back to FIG. 4, the server 204 transmits the job ID information to the printing data storage device 202 in operation 480, and the printing data storage device 202 receives and stores the job ID information in operation 490. When there is a printing data request for a particular job ID from the server 204 or the image forming apparatus 203, the printing data storage device 202 may transmit corresponding printing data based on job ID information stored therein.

Referring back to FIG. 3, after the server 204 receives metadata corresponding to printing data from the printing data storage device 202 storing the printing data, the server 204 may receive and store a part of the printing data in advance. Next, when a printing data transmission request is received from the image forming apparatus 203, the part of the printing data may be first transmitted to the image forming apparatus 203. The operation of the server 204 related to other devices will be described below in more detail with reference to FIG. 13.

Figure 13:
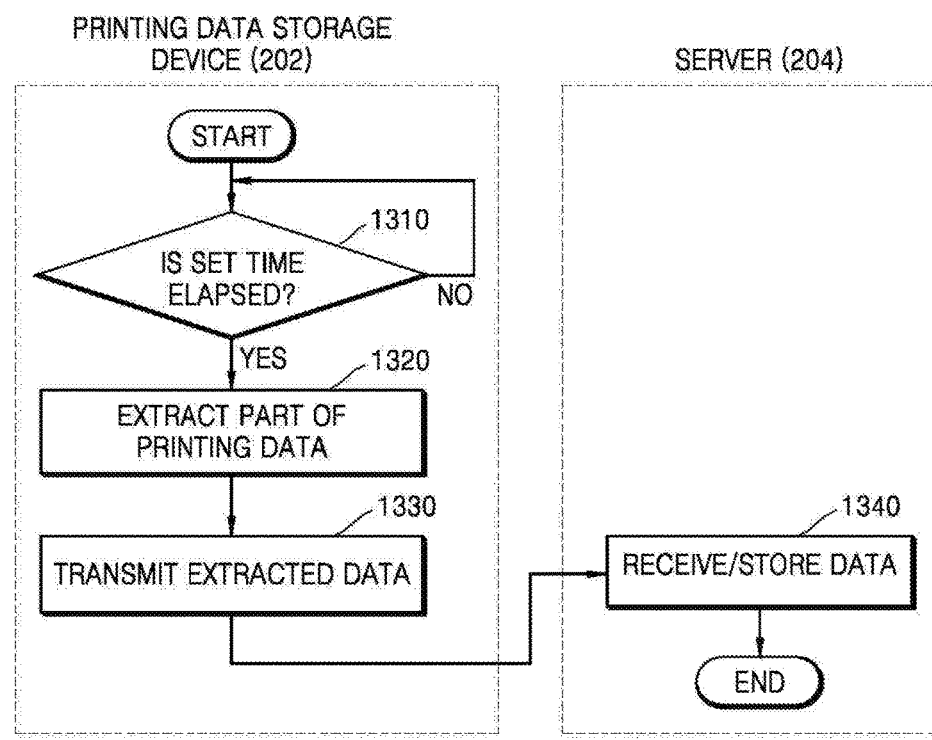
FIG. 13 is a diagram showing a process for transmitting a part of printing data according to an embodiment of the present disclosure.

FIG. 13 is a diagram showing a process for transmitting a part of printing data according to an embodiment of the present disclosure.

Referring to FIG. 13, in operation 1310, the printing data storage device 202 determines whether a set time is elapsed. When the set time is elapsed, the process proceeds to operation 1320 and a part of the printing data is extracted, and the part of the printing data is transmitted to the server 204 in operation 1330. The server 204 receives data from the printing data storage device 202 and stores the data in operation 1340.

The printing data storage device 202 transmits a part of printing data (corresponding to one to two pages or data of a particular size) to the server 204 in advance, because a user may print out a printing job, which has not been printed out for a certain time period, from another device. According to an embodiment, even when the image forming apparatus 203 is unable to communicate with the printing data storage device 202, a part of printing data may be stored in the server 204 in advance, and thus high printing speed may be provided.

Referring back to FIG. 3, in operation 320, the server 204 receives a request, from the image forming apparatus 203, to transmit printing job information. According to an embodiment, when a user logs into the image forming apparatus 203, the corresponding image forming apparatus 203 requests the server 204 for printing job information regarding the user.

Next, in operation 330, the server 204 determines a transmission route of the printing data based on whether the printing data storage device 202 and the image forming apparatus 203 may communicate with each other. According to an embodiment, when the server 204 determines that the printing data storage device 202 and the image forming apparatus 203 are unable to communicate with each other, it may be determined that the image forming apparatus 203 will receive the printing data via the server 204. When the server 204 determines that the printing data storage device 202 and the image forming apparatus 203 may communicate with each other, it may be determined that the image forming apparatus 203 will receive the printing data from the printing data storage device 202. At this time, the server 204 may check the address of the printing data storage device 202 in which the printing data of the logged-in user is stored based on job ID information stored in the server 204.

In other words, when the printing data storage device 202 and the image forming apparatus 203 are unable to communicate with each other, the image forming apparatus 203 receives the printing data via the server 204. According to an embodiment, the server 204 may receive a request, from the image forming apparatus 203, to transmit printing data, transmit to the printing data storage device 202 the request to transmit the printing data, receive printing data from the printing data storage device 202, and transmit the printing data to the image forming apparatus 203. The operation of the server 204 related to other devices will be described below in more detail with reference to FIG. 14.

Figure 14:
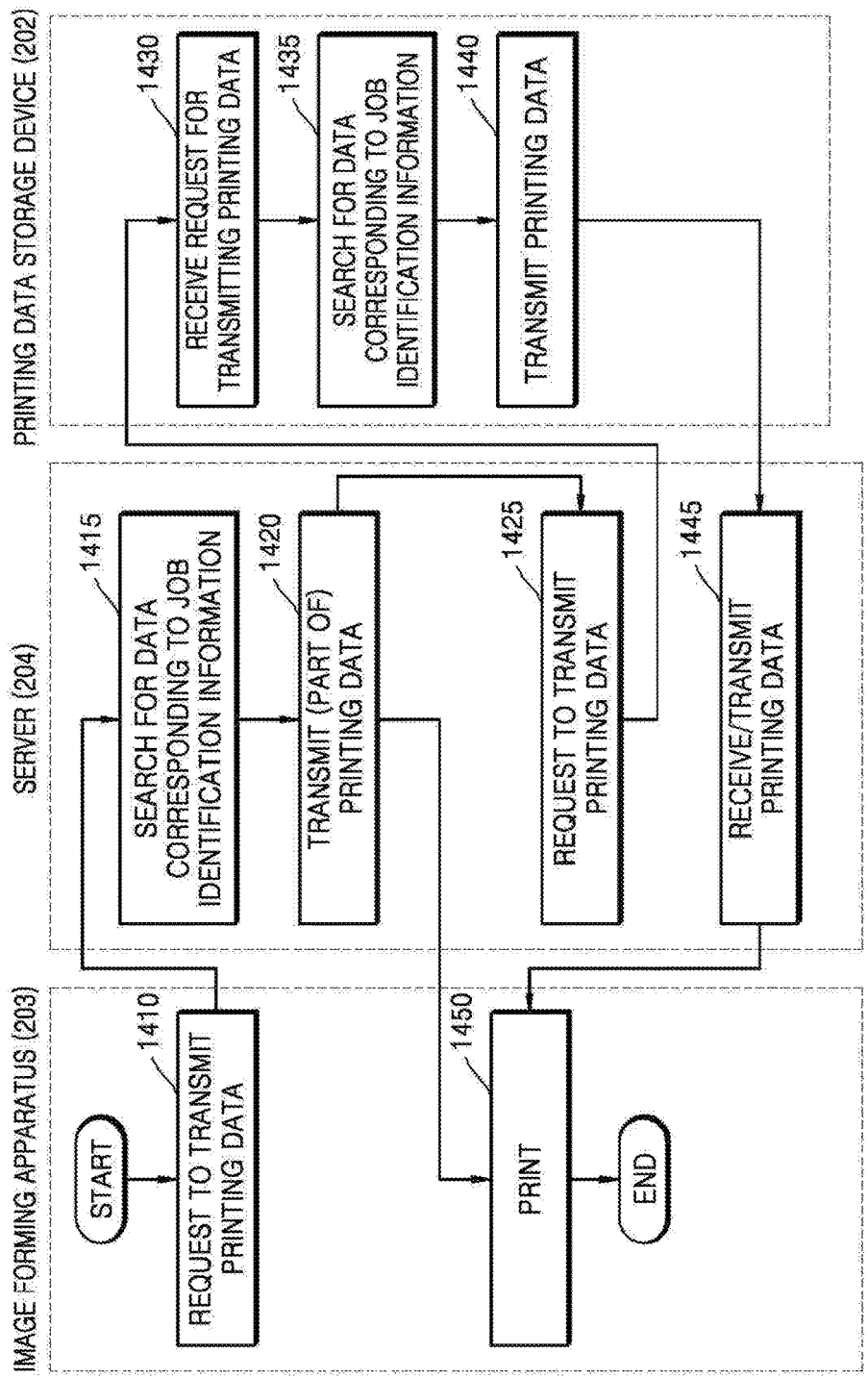
FIG. 14 is a diagram showing a process in which an image forming apparatus receives printing data from a server according to an embodiment of the present disclosure.

FIG. 14 is a diagram showing a process in which an image forming apparatus receives printing data from a server according to an embodiment of the present disclosure.

Referring to FIG. 14, in operation 1410, the image forming apparatus 203 requests the server 204 to transmit printing data. In this case, job ID information may be transmitted together in order to identify a particular job the printing data is requested for.

In operation 1415, the server 204 searches for printing data corresponding to the job ID information and first transmits a part of the printing data stored in the server 204 to the image forming apparatus 203 in operation 1420. The image forming apparatus 203 receives the part of the printing data first and prints out the part of the printing data in operation 1450. The process for transmitting and printing out a part of printing data first may be omitted if the part of the printing data is not stored in the server 204.

In operation 1425, the server 204 requests the printing data storage device 202 for transmitting printing data. In this case, job ID information may be transmitted together with the printing data to identify which job the printing data is requested for. In operation 1430, the printing data storage device 202 receives the request to transmit printing data. At this time, the server 204 may request only the remaining printing data except for the part of the data already transmitted to the image forming apparatus 203. In operation 1435, the printing data corresponding to the job ID information is searched for and transmitted to the server 204 in operation 1440.

In operation 1445, the server 204 receives the printing data from the printing data storage device 202 and transmits the printing data to the image forming apparatus 203. In operation 1450, the image forming apparatus prints out the printing data.

When the printing data storing device 202 and the image forming apparatus 203 may communicate with each other, the printing data is received directly from the printing data storing device 202. A description thereof will be given below with reference to FIG. 15.

Figure 15:
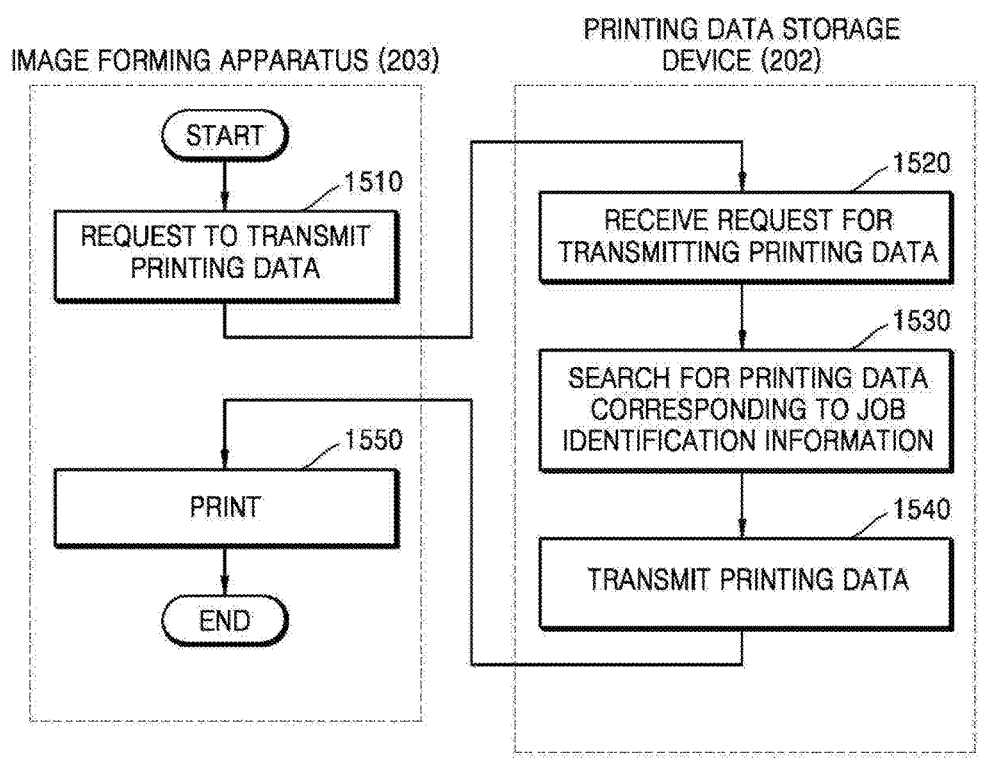
FIG. 15 is a diagram showing a process in which an image forming apparatus receives printing data from a printing data storage device according to an embodiment of the present disclosure.

FIG. 15 is a diagram showing a process in which an image forming apparatus receives printing data from a printing data storage device according to an embodiment of the present disclosure.

Referring to FIG. 15, in operation 1510, the image forming apparatus 203 requests the printing data storage device 202 to transmit printing data. In operation 1520, the printing data storage device 202 receives the request to transmit the printing data. Next, the printing data storage device 202 searches for the printing data corresponding to the job ID information in operation 1530 and transmits the printing data to the image forming apparatus 203 in operation 1540. In operation 1550, the image forming apparatus prints out the printing data.

According to an embodiment, when the image forming apparatus 203 may communicate with the printing data storage device 202, it is unnecessary to receive the printing data via the server 204 and the printing data may be received directly from the printing data storage device 202, thereby reducing the load of the server 204 and network traffic and increasing data transmission speed. As a result, high printing speed may be provided.

According to an embodiment, the server 204 may determine whether the printing data storing device 202 and the image forming apparatus 203 are included in a same network. When it is determined that the printing data storage device 202 and the image forming apparatus 203 are included in a same network, it may be determined that the printing data storage device 202 and the image forming apparatus 203 may communicate with each other. On the contrary, when it is determined that the printing data storage device 202 and the image forming apparatus 203 are included in different networks, it may be determined that the printing data storage device 202 and the image forming apparatus 203 are unable to communicate with each other. Devices connected to a same network have a same IP address range. Therefore, the server 204 may compare the IP address range of the printing data storage device 202 with the IP address range of the image forming apparatus 203 and determine whether the printing data storage device 202 and the image forming apparatus 203 are included in a same network.

Furthermore, according to an embodiment, the server 204 may receive information regarding peripheral devices to which the image forming apparatus 203 may be connected from the image forming apparatus 203. The server 204 may determine whether the printing data storage device 202 and the image forming apparatus 203 may communicate with each other based on information regarding peripheral devices to which the image forming apparatus 203 may be connected. In other words, when the printing data storing device 202 is included in the information regarding peripheral devices to which the image forming apparatus 203 may be connected, the server 204 may determine that the printing data storing device 202 and the image forming apparatus 203 may communicate with each other. Furthermore, when the printing data storing device 202 is not included in the information regarding peripheral devices to which the image forming apparatus 203 may be connected, the server 204 may determine that the printing data storing device 202 and the image forming apparatus 203 are unable to communicate with each other. The operation of the server 204 related to other devices will be described below in more detail with reference to FIGS. 9 and 10.

Figure 9:
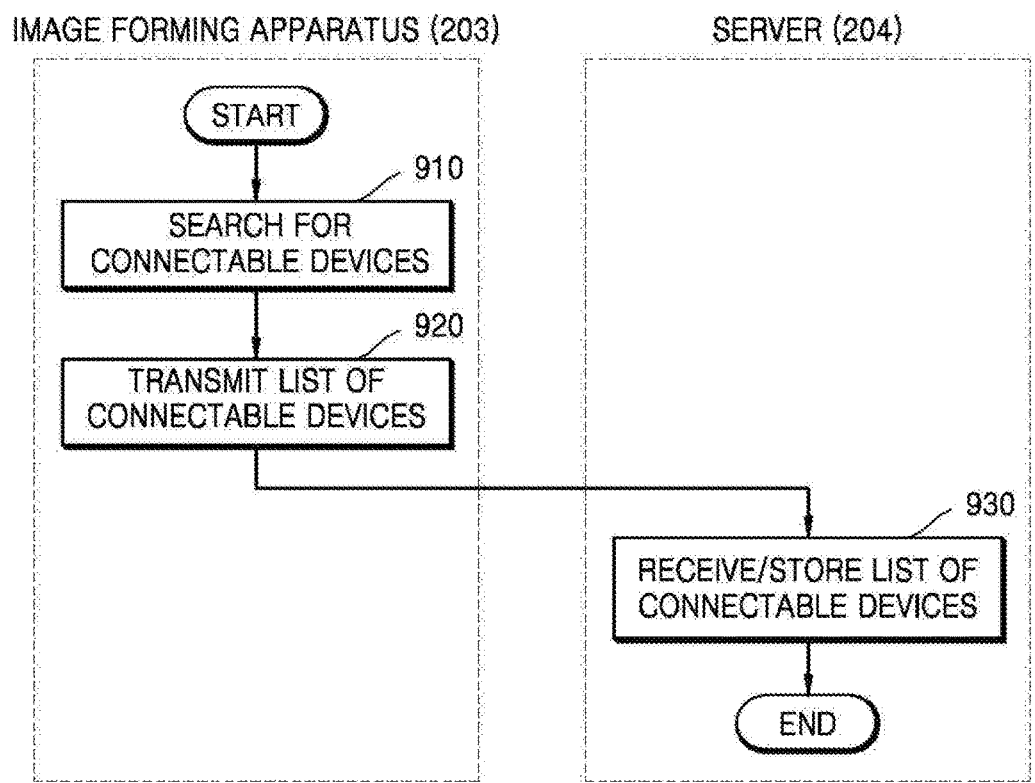
FIG. 9 is a diagram showing a process for transmitting a list of connectable devices according to an embodiment of the present disclosure.

FIG. 9 is a diagram showing a process for transmitting a list of connectable devices according to an embodiment of the present disclosure.

Referring to FIG. 9, in operation 910, the image forming apparatus 203 searches for nearby connectable devices. In other words, the image forming apparatus 203 searches for devices that are included in a same network and may communicate with the image forming apparatus 203. Furthermore, the image forming apparatus 203 may search for devices that are not included in a same network but may directly communicate with the image forming apparatus 203.

Next, in operation 920, the image forming apparatus 203 transmits a list of found connectable devices to the server 204. In operation 930, the server 204 receives and stores the list of connectable devices from the image forming apparatus 203.

According to an embodiment, the image forming apparatus 203 transmits a list of connectable peripheral devices to the server 204 in advance and the server 204 stores the list. Next, when the user logs into the image forming apparatus 203, the image forming apparatus 203 transmits a request for the printing job information to the server 204. The server 204 receives the request, compares metadata with the list of connectable peripheral devices, and determines whether the printing data storage device 202 and the image forming apparatus 203 may communicate with each other.

FIG. 10 is a diagram showing a list of connectable devices according to an embodiment of the present disclosure.

Referring to FIG. 10, the list of connectable devices may include a serial number 1010, a MAC address 1020, an IP address 1030 of the image forming apparatus 203 and IP addresses of devices to which the image forming apparatus 203 may be connected 1040. However, it is merely an example, and items included in the list of connectable devices may vary.

Referring back to FIG. 3, when job ID information includes two or more jobs of a logged-in user, a transmission route of printing data may be determined for each job.

In operation 340, the server 204 generates printing job information including metadata and an address. According to an embodiment, when the address of the server 204 is determined as the address to receive printing data, the address of the storage location 504 in the metadata may be changed to the address of the server 204, thereby generating printing job information including the modified metadata. Furthermore, printing job information including a separate address to receive printing data may be generated without modifying metadata.

Finally, the printing job information generated in operation 340 is transmitted to the image forming apparatus 203 in operation 350. The operation of the server 204 related to other devices will be described below in more detail with reference to FIGS. 6 through 8.

Figure 6:
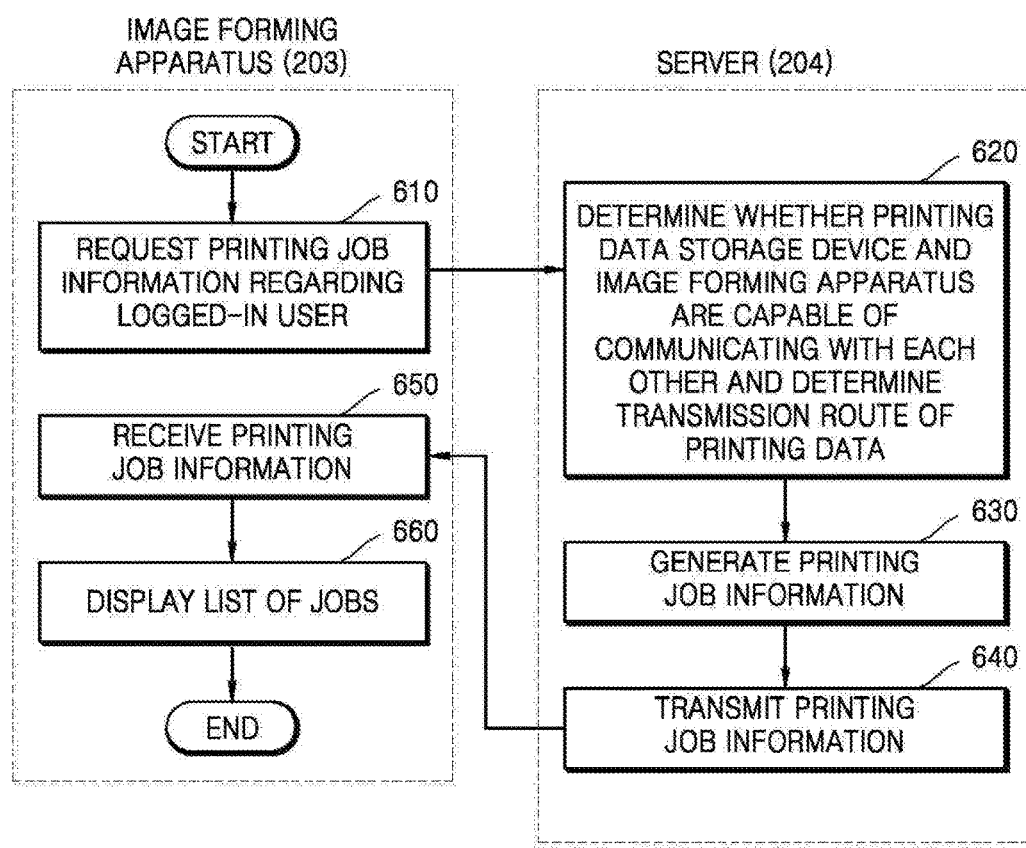
FIG. 6 is a diagram showing a process for transmitting printing job information according to an embodiment of the present disclosure.

FIG. 6 is a diagram showing a process for transmitting printing job information according to an embodiment of the present disclosure.

Referring to FIG. 6, when a user logs into the image forming apparatus 203, the image forming apparatus 203 requests printing job information regarding the user to the server 204 in operation 610. The user may log into the image forming apparatus 203 by contacting a user ID card or inputting ID information.

The server 204 receives the printing job information request and determines a transmission route of the printing data based on whether the printing data storage device 202 and the image forming apparatus 203 may communicate with each other, in operation 620. According to an embodiment, as described above, the server 204 may determine whether the printing data storage device 202 and the image forming apparatus 203 are included in a same network based on IP address ranges and may determine whether the printing data storage device 202 and the image forming apparatus 203 may communicate with each other. Furthermore, the server 204 may also receive information regarding peripheral devices to which the image forming apparatus 203 may be connected from the image forming apparatus 203 and may determine whether the printing data storage device 202 and the image forming apparatus 203 may communicate with each other based on the information regarding peripheral devices to which the image forming apparatus 203 may be connected.

Next, in operation 630, the server 204 generates printing job information. An example of the printing job information is shown in FIG. 7.

FIG. 7 is a diagram showing printing job information according to an embodiment of the present disclosure.

Referring to printing job information 701 shown in FIG. 7, information regarding a location at which printing data is stored may be included in an item "Storage". When the address of the printing data storage device 202 is determined as the address to receive the printing data, the item "Storage" may indicate the address of the printing data storage device 202 included in metadata or received from the printing data storage device 202. When the address of the server 204 is determined as the address to receive the printing data, the item "Storage" may indicate the address of the server 204. However, it is merely an example, and items included in printing job information may vary.

Referring back to FIG. 6, the server 204 transmits the printing job information to the image forming apparatus 203 in operation 640. The image forming apparatus 203 receives the printing job information in operation 650 and generates a job list based on the printing job information and displays the job list to a user in operation 660. An example of the job list is shown in FIG. 8.

Figure 8:
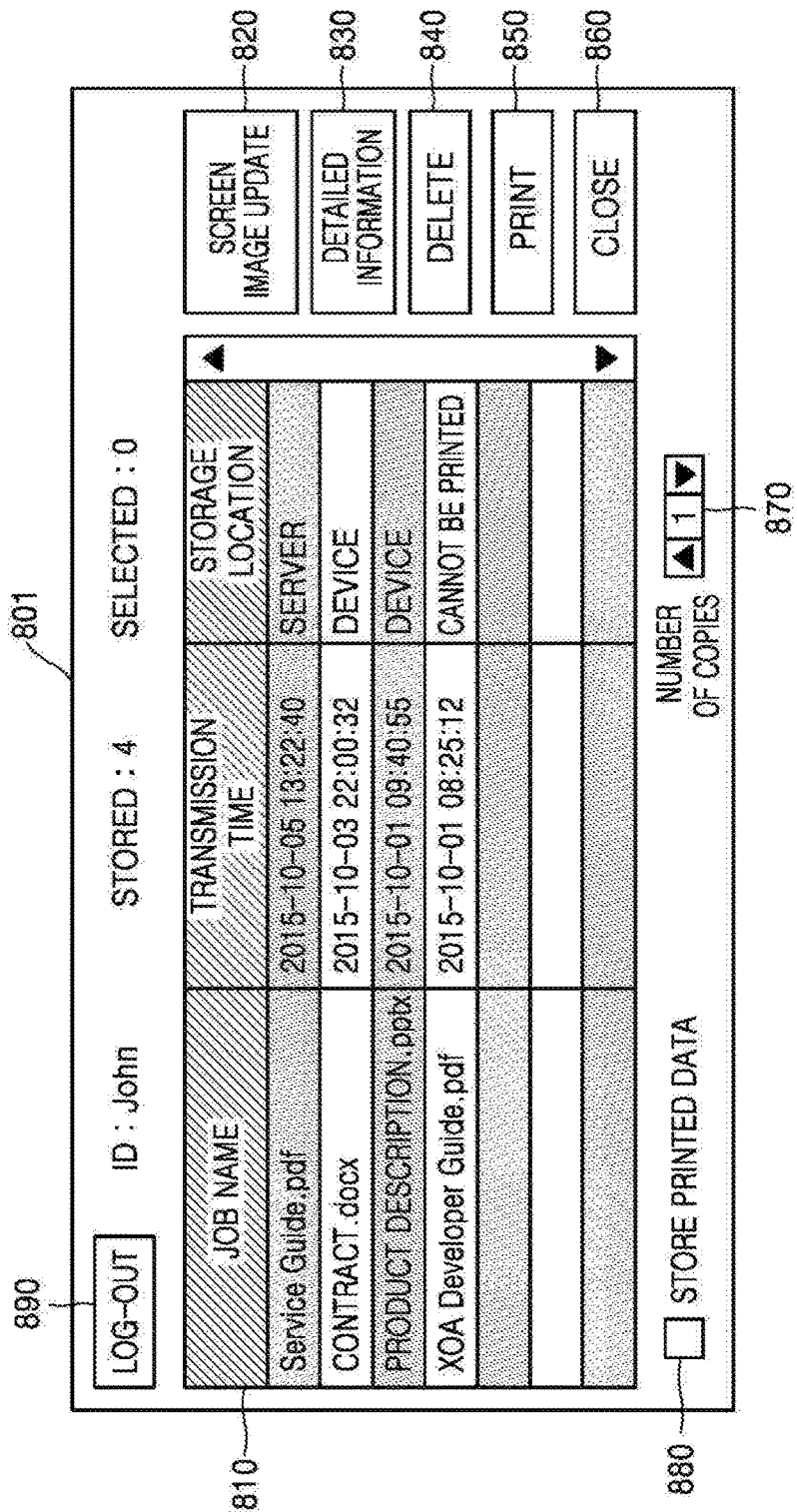
FIG. 8 is a diagram showing a display of an image forming apparatus that displays a job list according to an embodiment of the present disclosure.

FIG. 8 is a diagram showing a display of an image forming apparatus that displays a job list according to an embodiment of the present disclosure.

Referring to a display 801 shown in FIG. 8, a job list 810 of a user logged into the image forming apparatus 203 is displayed. The user may select a desired job from the job list 810 and select an operation such as detailed information 830, delete 840, and print 850 for the corresponding job. At this time, the user may also select number of copies 870 or store printed data 880. Furthermore, a screen image update 820 may be selected to update the job list, or a close 860 may be selected to close the job list. Furthermore, the user may select logout 890 after performing a desired operation.

The job list 810 includes a job name, a transmission time, and a storage location, etc., and an image forming apparatus may receive printing data from the printing data storage device 202 or the server 204, which is displayed as a 'device' based on the location of printing data corresponding to a job selected by the user. Furthermore, when corresponding printing data is not found, the job list 810 may display that printing is impossible. However, it is merely an example, and items included in a job list may vary.

Figure 11:
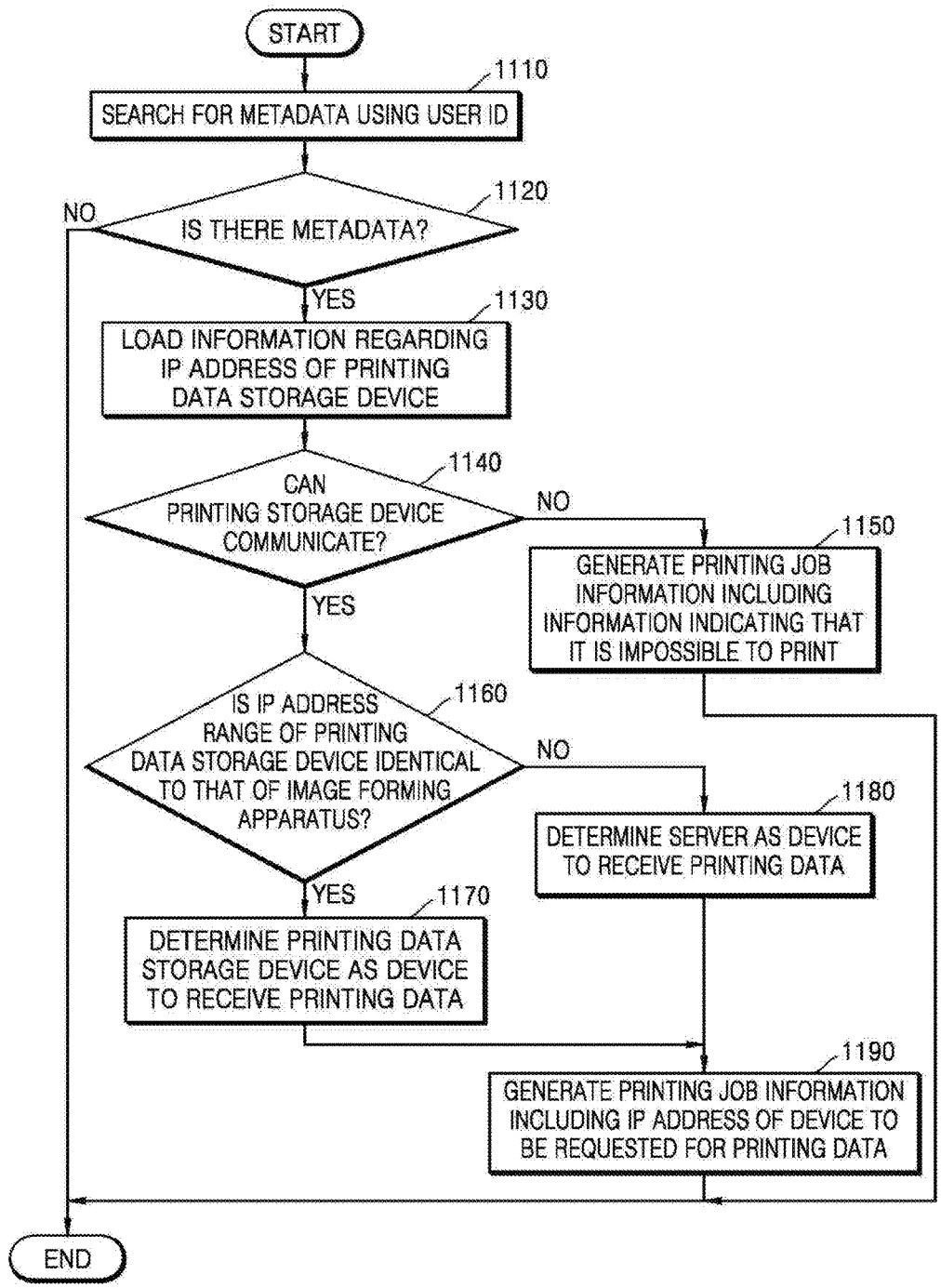
FIG. 11 is a flowchart of a method of operating a server according to an embodiment of the present disclosure.

FIG. 11 is a flowchart of a method of operating a server, according to an embodiment of the present disclosure.

FIG. 11 shows a method of operating a server that determines a device to receive printing data based on IP address ranges according to an embodiment of the present disclosure.

Referring to FIG. 11, in operation 1110, the server 204 searches for metadata by using a user ID. In operation 1120, the server 204 determines whether there is metadata corresponding to the user ID and, if there is no corresponding metadata, the server 204 terminates the process. If there is metadata corresponding to the user ID, the server 204 loads IP address information regarding the printing data storage device 202 in operation 1130 and determines whether the printing data storage device 202 is in communicable state in operation 1140. When the printing data storage device 202 is not in communicable state, the server 204 generates printing job information including information indicating that printing is impossible in operation 1150. When the printing data storage device 202 is in communicable state, the method proceeds to operation 1160.

In operation 1160, the server 204 determines whether the IP address ranges of the printing data storage device 202 and the image forming apparatus 203 are the identical to each other. When the IP address ranges of the printing data storing device 202 and the image forming apparatus 203 are identical to each other, the server 204 determines the printing data storage device 202 as a device to receive printing data in operation 1170. When the IP address ranges of the printing data storage device 202 and the image forming apparatus 203 are different from each other, the server 204 determines the server 204 as a device to receive the printing data in operation 1180. Next, in operation 1190, printing job information including the IP address of the device to be requested for printing data is generated.

Figure 12:
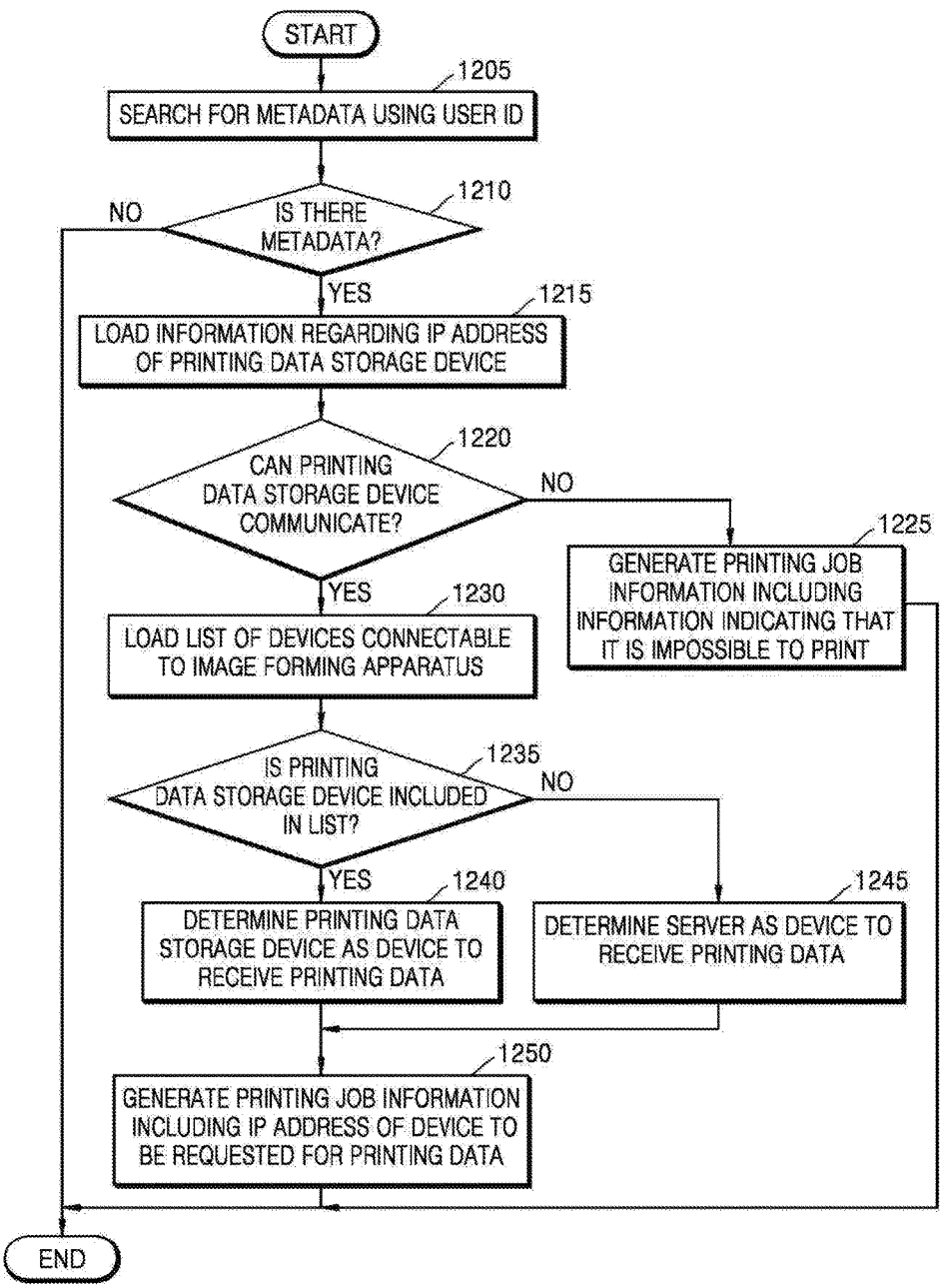
FIG. 12 is a flowchart of a method of operating a server according to an embodiment of the present disclosure.

FIG. 12 is a flowchart of another method of operating a server, according to an embodiment of the present disclosure.

FIG. 12 shows a method of operating a server that determines a device to receive printing data based on a list of devices that may be connected to an image forming apparatus.

Referring to FIG. 12, operations 1205 through 1225 are identical to operations 1110 through 1150 of FIG. 11, and operations 1240 through 1250 are identical to operations 1170 through 1190 of FIG. 11. Therefore, repeated descriptions thereof will be omitted.

In operation 1230, the server 204 loads a list of devices that may be connected to the image forming apparatus 203 and, in operation 1235, determines whether the printing data storage device 202 is included in the list of devices that may be connected to the image forming apparatus 203. When the printable data storage device 202 is included in the list of devices that may be connected to the image forming apparatus 203, the server 204 determines the printing data storage device 202 as a device to receive the printing data in operation 1240. When the printable data storage device 202 is not included in the list of devices that may be connected to the image forming apparatus 203, the server 204 determines the server 204 as a device to receive the printing data in operation 1245.

Figure 16:
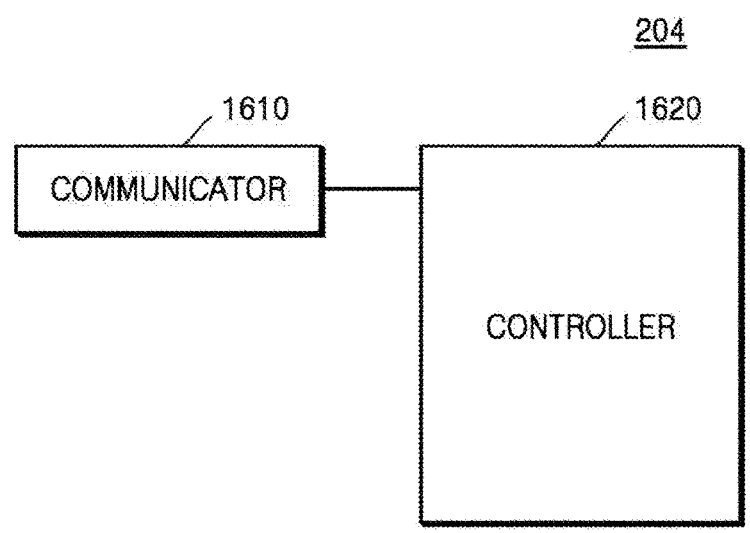
FIG. 16 is a diagram showing an internal configuration of a server according to an embodiment of the present disclosure.

FIG. 16 is a diagram showing an internal configuration of a server according to an embodiment of the present disclosure.

Referring to FIG. 16, the server 204 according to an embodiment includes a communicator (e.g., a transceiver) 1610 and a controller (e.g., a processor) 1620.

The communicator 1610 communicates with an external device. The communicator 1610 may be connected to a network via a wire or wirelessly and may communicate with an external device. According to an embodiment, the communicator 1610 communicates with the printing data storage device 202 and the image forming apparatus 203 and may transmit and receive data to and from the printing data storage device 202 and the image forming apparatus 203. For example, the communicator 1610 may include a short-range communication module, a mobile communication module, a wireless Internet module, a wired Internet module, and etc. Furthermore, the communicator 1610 may include one or more components.

The controller 1620 controls the overall operation of the server 204 and may determine a transmission route of printing data. The controller 1620 may include a random-access memory (RAM) that stores signals or data input from the outside of the server 204 or is used as a storage area corresponding to various jobs performed in an electronic device, a read-only memory (ROM) storing a control program for controlling peripheral devices, and a processor. The processor may be implemented as a system-on-chip (SoC) incorporating a core (not shown) and a graphics processing unit (GPU) (not shown). Furthermore, the processor may include a plurality of processors.

According to an embodiment, the controller 1620 receives metadata corresponding to printing data from the printing data storage device 202 storing the printing data, receives, from the server 204, a request to transmit printing job information, generates the printing job information, and transmits the printing job information to the image forming apparatus 203. Furthermore, the controller 1620 determines a transmission route of the printing data based on whether the printing data storage device 202 and the image forming apparatus 203 may communicate with each other. At this time, the printing job information may include metadata and a transmission route.

According to an embodiment, when the server 204 determines that the image forming apparatus 203 is unable to communicate with the printing data storage device 202, the server 204 may instruct the image forming apparatus 203 to receive printing data via the server 204. On the other hand, when the server 204 determines that the image forming apparatus 203 may communicate with the printing data storage device 202, the server 204 may instruct the image forming apparatus 203 to receive printing data from the printing data storage device 202.

According to an embodiment, the controller 1620 may determine a transmission route of printing data based on whether the printing data storage device 202 and the image forming apparatus 203 are included in a same network, where the IP address range of the printing data storage device 202 may be compared to the IP address range of the image forming apparatus 203. Furthermore, the controller 1620 may also receive, from the image forming apparatus 203, a request to transmit printing data, transmit the request to the printing data storage device 202, receive printing data from the printing data storage device 202, and transmit the corresponding printing data to the image forming apparatus 203. Furthermore, after the controller 1620 receives metadata corresponding to the printing data from the printing data storage device 202, the controller 1620 may receive and store a part of the printing data in advance and, when a request to transmit the printing data is received from the server 204, may transmit the part of the printing data to the server 204 first.

Figure 17:
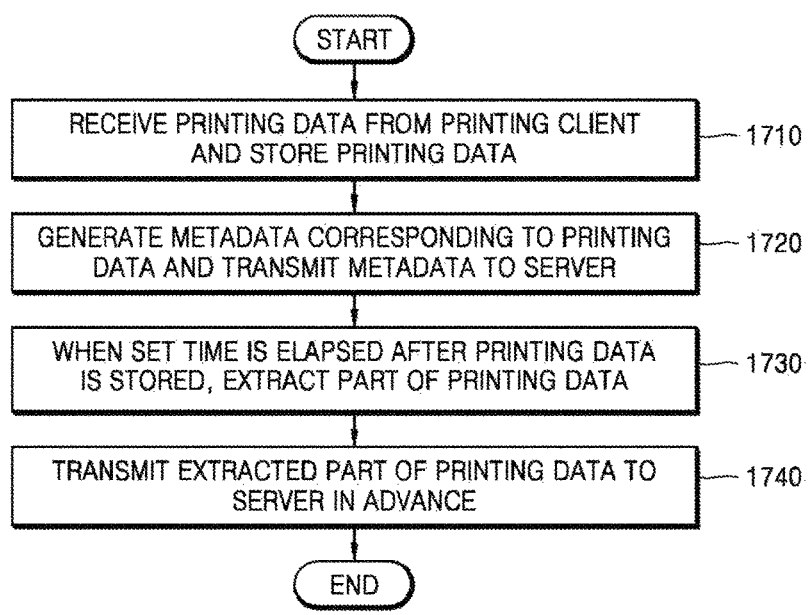
FIG. 17 is a flowchart of a method of operating a printing data storage device according to an embodiment of the present disclosure.

FIG. 17 is a flowchart of a method of operating a printing data storage device according to an embodiment of the present disclosure.

Descriptions identical to those given above will be omitted below.

Referring to FIG. 17, in operation 1710, the printing data storage device 202 receives printing data from a printing client and stores the printing data. Next, in operation 1720, metadata corresponding to the printing data is generated and transmitted to the server 204.

In operation 1730, the printing data storage device 202 extracts a part of the printing data when a preset time is elapsed after storing the printing data and transmits the extracted part of the printing data to the server in advance in operation 1740.

Figure 18:
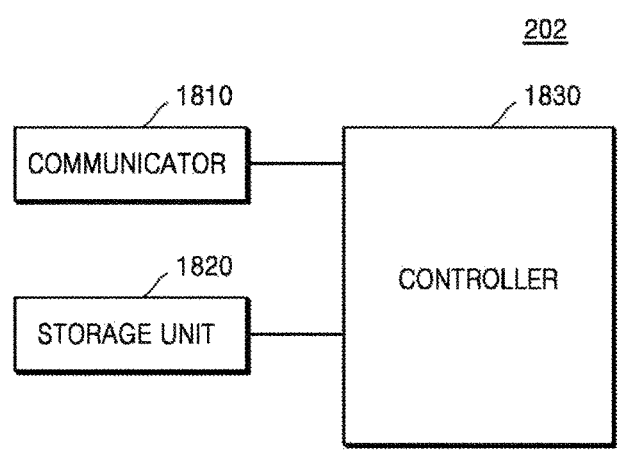
FIG. 18 is a diagram showing an internal configuration of a printing data storage device according to an embodiment of the present disclosure.

FIG. 18 is a diagram showing an internal configuration of a printing data storage device according to an embodiment of the present disclosure.

Referring to FIG. 18, the printing data storage device 202 according to an embodiment includes a communicator (e.g., a transceiver) 1810, a storage unit (e.g., a memory) 1820, and a controller (e.g., a processor) 1830. Furthermore, an image forming apparatus may function as the printing data storage device 202.

The communicator 1810 communicates with an external device. The communicator 1810 may be connected to a network via a wire or wirelessly and may communicate with an external device. According to an embodiment, the communicator 1810 communicates with the server 204 and the image forming apparatus 203 and may transmit and receive data to and from the server 204 and the image forming apparatus 203. For example, the communicator 1810 may include a short-range communication module, a mobile communication module, a wireless Internet module, a wired Internet module, and etc. Furthermore, the communicator 1810 may include one or more components.

The storage unit 1820 stores data and programs necessary for operation of an image forming apparatus 203. The storage unit 1820 may include at least one recording medium from among a flash memory type memory, a hard disk type memory, a multimedia card micro type memory, a card type memory (e.g., a secure digital (SD) memory, an extreme digital (XD) memory, etc.), a RAM, a static RAM (SRAM), a ROM, an electrically erasable programmable ROM (EEPROM), a programmable ROM (PROM), a magnetic memory, a magnetic disk, and an optical disc.

The storage unit 1820 according to an embodiment stores printing data.

The controller 1830 controls the overall operation of the server 204 and may transmit printing data to the server 204. The controller 1830 stores signals or data input from the outside of the server 204, a RAM used as a storage area corresponding to various jobs performed in the electronic device, a ROM storing a control program for controlling peripheral devices, And a processor. The processor may be implemented as a SoC incorporating a core (not shown) and a GPU (not shown). The processor may also include a plurality of processors.

The controller 1830 controls the overall operation of the server 204 and may transmit printing data to the server 204. The controller 1830 may include a RAM that stores signals or data input from the outside of the server 204 or is used as a storage area corresponding to various jobs performed in an electronic device, a ROM storing a control program for controlling peripheral devices, and a processor. The processor may be implemented as a SoC incorporating a core (not shown) and a GPU (not shown). Furthermore, the processor may include a plurality of processors.

According to an embodiment, the controller 1830 may receive and store printing data from a print client, generate metadata corresponding to the printing data, and transmit the generated metadata to the server 204 and, when a set time is elapsed after storing the printing data, may extract a part of the printing data and transmit the extracted part of the printing data to the server 204 in advance. Furthermore, when there is a request to transmit the printing data, the controller 1830 may transmit the remaining printing data except the part of the printing data transmitted in advance to the server 204.

Meanwhile, the above-described embodiments may be implemented as a program that may be executed by a computer and may be implemented in a general-purpose digital computer that executes a program by using a computer-readable recording medium.

Examples of the computer readable recording medium include magnetic storage media (e.g., a ROM, a floppy disk, a hard disk, or the like) and optical reading media (e.g., a compact disc-ROM (CD-ROM), a digital versatile disc (DVD) or the like).

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating a server, the method comprising:
 receiving, through a first network, metadata corresponding to printing data from a printing data storage device that stores the printing data;
 receiving, through the first network, and storing a part of the printing data after the metadata corresponding to the printing data is received from the printing data storage device that stores the printing data;
 receiving, from an image forming apparatus through the first network, a request to transmit printing job information;
 determining a transmission route of the printing data based on whether the printing data storage device and the image forming apparatus are capable of communicating with each other through a second network;
 generating the printing job information comprising the metadata and the transmission route; and
 transmitting the printing job information to the image forming apparatus through the first network.

2. The method of claim 1, wherein, in the determining of the transmission route, when it is determined that the image forming apparatus is unable to communicate with the printing data storage device through the second network, the image forming apparatus is instructed to receive the printing data via the server through the first network, and,
 when it is determined that the image forming apparatus may communicate with the printing data storage device through the second network, the image forming apparatus is instructed to receive the printing data from the printing data storage device through the second network.

3. The method of claim 1, wherein the determining of the transmission route comprises determining the transmission route based on whether the printing data storage device and the image forming apparatus are included in the second network.

4. The method of claim 3, wherein the determining of the transmission route comprises comparing an Internet protocol (IP) address range of the printing data storage device to an IP address range of the image forming apparatus.

5. The method of claim 1, wherein the determining of the transmission route comprises:
 receiving information regarding peripheral devices that are connectable to the image forming apparatus from the image forming apparatus; and
 determining whether the printing data storage device and the image forming apparatus are capable of communicating with each other based on the information regarding the peripheral devices.

6. The method of claim 1, further comprising:
 receiving, from the image forming apparatus, a request to transmit the printing data;
 transmitting, to the printing data storage device, the request to transmit the printing data;
 receiving the printing data from the printing data storage device; and
 transmitting the printing data to the image forming apparatus.

7. The method of claim 6, wherein
 the receiving of the request to transmit the printing data comprises, when the request to transmit the printing data is received from the image forming apparatus, the part of the printing data is transmitted to the image forming apparatus first.

8. A server comprising:
 a transceiver to communicate with an external device through a first network; and
 a processor to:
  receive, through the first network, metadata corresponding to printing data from a printing data storage device that stores the printing data,
  receive, through the first network, and store a part of the printing data after the metadata corresponding to the printing data is received from the printing data storage device that stores the printing data, receive, from an image forming apparatus through the first network, a request to transmit printing job information, generate printing job information, transmit, through the first network, the printing job information to the image forming apparatus, and determine a transmission route of the printing data based on whether the printing data storage device and the image forming apparatus are capable of communicating with each other through a second network, wherein the printing job information comprises the metadata and the transmission route.

9. The server of claim 8, wherein, when it is determined that the image forming apparatus is unable to communicate with the printing data storage device through the second network, the processor instructs the image forming apparatus to receive the printing data via the server through the first network, and wherein, when it is determined that the image forming apparatus may communicate with the printing data storage device through the second network, the processor instructs the image forming apparatus to receive the printing data from the printing data storage device through the second network.

10. The server of claim 8, wherein the processor determines the transmission route based on whether the printing data storage device and the image forming apparatus are included in the second network.

11. The server of claim 10, wherein the processor compares an Internet protocol (IP) address range of the printing data storage device to an IP address range of the image forming apparatus.

12. The server of claim 8, wherein the processor:

receives information regarding peripheral devices that are connectable to the image forming apparatus from the image forming apparatus, and determines whether the printing data storage device and the image forming apparatus are capable of communicating with each other based on the information regarding peripheral devices.

13. The server of claim 8, wherein the processor:

receives, from the image forming apparatus, a request to transmit the printing data, transmits the request to transmit the printing data to the printing data storage device, receives the printing data from the printing data storage device, and transmits the printing data to the image forming apparatus.

14. The server of claim 13, wherein the processor, when the request to transmit the printing data is received from the image forming apparatus, transmits the part of the printing data to the image forming apparatus first.

* * * * *